(12) United States Patent
Ishihara (10) Patent No.: US 12,282,109 B2
(45) Date of Patent: Apr. 22, 2025

(54) POSITION DETECTING SYSTEM

(71) Applicant: Murata Manufacturing Co., Ltd., Kyoto (JP)

(72) Inventor: Takashi Ishihara, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 624 days.

(21) Appl. No.: 16/514,010

(22) Filed: Jul. 17, 2019

(65) Prior Publication Data

US 2019/0339352 A1 Nov. 7, 2019

Related U.S. Application Data

(63) Continuation of application No. PCT/JP2018/005996, filed on Feb. 20, 2018.

(30) Foreign Application Priority Data

Feb. 27, 2017 (JP) .................................. 2017-035190

(51) Int. Cl.
*G01S 5/02* (2010.01)
*G01S 5/04* (2006.01)
(Continued)

(52) U.S. Cl.
CPC ........ *G01S 5/0268* (2013.01); *G01S 5/02213* (2020.05); *G01S 5/04* (2013.01); *G01S 5/06* (2013.01); *G01S 5/14* (2013.01)

(58) Field of Classification Search
None
See application file for complete search history.

(56) References Cited

U.S. PATENT DOCUMENTS 5,872,548 A * 2/1999 Lopez .................... H01Q 21/28
343/890
6,448,930 B1 * 9/2002 Judd ....................... H01Q 1/007
343/700 MS
(Continued)

FOREIGN PATENT DOCUMENTS

EP 1030531 A1 * 8/2000 ............ H04W 64/00
JP 2007-013500 A 1/2007
(Continued)

OTHER PUBLICATIONS

International Search Report for International Application No. PCT/JP2018/005996 dated Apr. 24, 2018.
(Continued)

*Primary Examiner* — Whitney Moore
(74) *Attorney, Agent, or Firm* — McDonald Hopkins LLC (57) ABSTRACT

A position detecting system includes receivers and a control unit. The four receivers are attached at positions different from one another in the circumferential direction of a pillar extending in the vertical direction. Each of first areas, which expands in the circumferential direction of the pillar, is an area in which the corresponding three receivers among the receivers receive radio waves from a transmitter directly, and is an area in which the remaining one receiver does not receive radio waves from the transmitter directly. Each of second areas is an area in which the corresponding two receivers among the receivers receive radio waves from the transmitter directly, and is an area in which the remaining two receivers do not receive radio waves from the transmitter directly. The control unit calculates the position of the transmitter by using different position computational algorithms for the first areas and the second areas.

9 Claims, 9 Drawing Sheets

(51) Int. Cl.
*G01S 5/06* (2006.01)
*G01S 5/14* (2006.01)

(56) References Cited

U.S. PATENT DOCUMENTS

| | | | |
|---|---|---|---|
| 9,368,880 B2 * | 6/2016 | Solondz | H01Q 1/246 |
| 2004/0063441 A1 | 4/2004 | Diao et al. | |
| 2008/0224930 A1 | 9/2008 | Chizhik et al. | |
| 2009/0312057 A1 * | 12/2009 | Moon | H01Q 9/12 |
| | | | 455/562.1 |
| 2010/0079282 A1 * | 4/2010 | Icove | G01K 11/006 |
| | | | 340/561 |
| 2012/0013508 A1 | 1/2012 | Bao et al. | |

FOREIGN PATENT DOCUMENTS

| | | |
|---|---|---|
| JP | 2008-233017 A | 10/2008 |
| JP | 2009-047556 A | 3/2009 |
| JP | 2015-045531 A | 3/2015 |
| WO | 02/80601 A1 | 10/2002 |
| WO | 2010/064159 A1 | 6/2010 |
| WO | WO-2017063032 A1 * | 4/2017 ............... G01S 5/28 |

OTHER PUBLICATIONS

Written Opinion for International Application No. PCT/JP2018/005996 dated Apr. 24, 2018.

* cited by examiner

POSITION DETECTING SYSTEM

This is a continuation of International Application No. PCT/JP2018/005996 filed on Feb. 20, 2018 which claims priority from Japanese Patent Application No. 2017-035190 filed on Feb. 27, 2017. The contents of these applications are incorporated herein by reference in their entireties.

BACKGROUND OF THE DISCLOSURE

Field of the Disclosure

The present disclosure relates to a position detecting system that detects the position of a transmitter.

Description of the Related Art

Typically, a position detecting system that detects the position of a movable transmitter (mobile station) such as a wireless terminal is known (for example, see Patent Document 1). Patent Document 1 discloses the configuration in which multiple receivers (fixed stations), disposed at fixed positions distant from each other, receive signals transmitted from a transmitter. In the position detecting system described in Patent Document 1, each receiver detects the angle of arrival and the arrival time of a signal from the transmitter. A data processing apparatus (host), which is connected to the receivers, obtains the position of the transmitter on the basis of information, which is obtained from the receivers, about the angle of arrival, the arrival time, and the like.

Patent Document 1: Japanese Unexamined Patent Application Publication No. 2007-13500

BRIEF SUMMARY OF THE DISCLOSURE

In the position detecting system disclosed in Patent Document 1, to improve the accuracy of a detected position, it is preferable to dispose the receivers at positions distant from each other as far as possible, whereas typical receivers need supplied power. Therefore, there arises a problem in that wiring needs to be done for multiple receivers that are disposed in a wide area.

To detect the arrival time of a signal, multiple receivers need to be synchronized, and data needs to be received/transmitted between the receivers and the data processing apparatus. At that time, when the multiple receivers are disposed far apart, the synchronization and the reception/transmission of data are performed mainly in a wireless manner. Thus, the following problems arise: accuracy in wireless synchronization is easily decreased; a part of a frequency band which serves as a wireless resource is exclusively used in communication between the receivers and the data processing apparatus.

The present disclosure is made in view of the problems of the related art which are described above, and an object thereof is to provide a position detecting system in which the entire system may be disposed in a small area.

(1) To address the issues described above, the present disclosure provides a position detecting system including three or more receivers that receive a radio wave from a transmitter, and a control unit that is connected to the receivers by wires. The three or more receivers are attached at positions different from one another in a circumferential direction of a pillar-shaped member extending in a vertical direction. A first area expanding in the circumferential direction of the pillar-shaped member is an area in which three or more of the receivers receive the radio wave of the transmitter directly. A second area which is different from the first area and which expands in the circumferential direction of the pillar-shaped member is an area in which two of the receivers receive the radio wave from the transmitter directly. The control unit calculates a position of the transmitter by using different position computational algorithms for the first area and the second area.

According to the present disclosure, three or more receivers are attached to the pillar-shaped member. Therefore, compared with the case in which multiple receivers are disposed far apart, three or more receivers may be easily connected to the control unit by wires. Therefore, construction cost for the system installation may be reduced, enabling the system to be constructed at low cost. In addition, the receivers are connected to the control unit by wires. Compared with the case of wireless connection, the control unit may collect positioning data of the transmitter without an influence from nearby data communication.

In addition to this, three or more receivers are attached in the circumferential direction of the pillar-shaped member at positions different from each other. Therefore, these receivers receive radio waves from the transmitter, whereby the position of the transmitter may be detected. At that time, the first area is an area (LOS: Line Of Sight) in which three or more receivers receive radio waves from the transmitter directly. Thus, the control unit may determine the position of the transmitter in the first area by using a position detection algorithm using information from the three or more receivers that are in the LOS environment.

In contrast, the second area is an area in which two receivers receive radio waves from the transmitter directly. The remaining receivers are positioned in an area (NLOS: Non Line Of Sight) in which radio waves from the transmitter are not received directly. Therefore, it is not possible to determine the position of the transmitter only by using information from the two receivers that are in the LOS environment. At that time, the control unit may determine the position of the transmitter in the second area by using a position detection algorithm using a combination of information from receivers in the LOS environment and information from receivers in the NLOS environment. As a result, the position of the transmitter may be detected with high accuracy in both of the first area and the second area.

(2) According to the present disclosure, in the first area, the control unit calculates the position of the transmitter by using a position detection algorithm based on a difference in time of arrival of the radio wave from the transmitter. In the second area, in addition to calculation of the position based on the difference in time of arrival of the radio wave, the control unit calculates the position of the transmitter by using a position detection algorithm obtained by combining any pieces of information. The pieces of information include an angle of arrival of the radio wave and an estimated distance based on a strength or arrival time of the radio wave.

According to the present disclosure, the first area is an area in which three or more receivers receive radio waves from the transmitter directly. Therefore, the control unit may determine the position of the transmitter in the first area on the basis of information from the three or more receivers that are in the LOS environment, by using a position detection algorithm using the TDOA (Time Differential Of Arrival) method, the AOA (Angle Of Arrival) method, or a combination of both. In contrast, the second area is an area in which two receivers receive radio waves from the transmitter directly. The remaining receivers are disposed in an area in which radio waves from the transmitter are not received directly. Therefore, in use of the TDOA method, the accuracy of the position of the transmitter is decreased. At that time, the angle of arrival (AOA) of a radio wave may be estimated on the basis of a direct wave received by two receivers. Alternatively, the distances between the transmitter and the receivers may be estimated on the basis of the strength and/or the time of arrival of a radio wave. Therefore, by combining information about the angle of arrival and/or the estimated distance with TDOA, the position of the transmitter in the second area may be determined.

(3) According to the present disclosure, the pillar-shaped member has a polygonal cross section. At least one of the receivers is attached to a corner portion of the pillar-shaped member.

Compared with the case in which receivers are attached to planar portions of the pillar-shaped member, the configuration described above enables the angular range, which is in the LOS environment, around a receiver to be widened. That is, a receiver attached to a corner portion of the pillar-shaped member may receive radio waves from the transmitter over an angular range larger than 180°. Therefore, a smaller number of receivers may be used to receive radio waves from the transmitter in the entire area around the pillar-shaped member.

(4) According to the present disclosure, different receivers are attached to the pillar-shaped member at positions that are identical to positions of the receivers in the circumferential direction and that are different in the vertical direction.

For example, even when multi-path fading occurs, the configuration described above causes the number of alternatives of receivers to be increased. Therefore, a receiver in the LOS environment may be selected so that degradation in position detection based on an error in received data is suppressed. In addition, data received by the receivers and data received by the different receivers may be used to detect the three-dimensional position of the transmitter.

(5) According to the present disclosure, different position detection algorithms are applied to the receivers and the different receivers.

The configuration described above enables an existing receiver suitable for a position detection algorithm to be selected. Compared with the case in which the receivers compatible with multiple position detection algorithms are included, an inexpensive system may be constructed.

DETAILED DESCRIPTION OF THE DISCLOSURE

Position detecting systems according to embodiments of the present disclosure will be described in detail below by referring to the accompanying drawings.

FIGS. 1 to 7 illustrate a position detecting system 1 according to a first embodiment. The position detecting system 1 includes receivers 3A to 3D and a control unit 4 (e.g., a controller comprising an integrated circuit or the like). The first embodiment describes, as an example, the case in which the position detecting system 1 is attached, for example, to a pillar 101 that is disposed between the floor and the ceiling of a building and that extends in the vertical direction.

Figure 2:
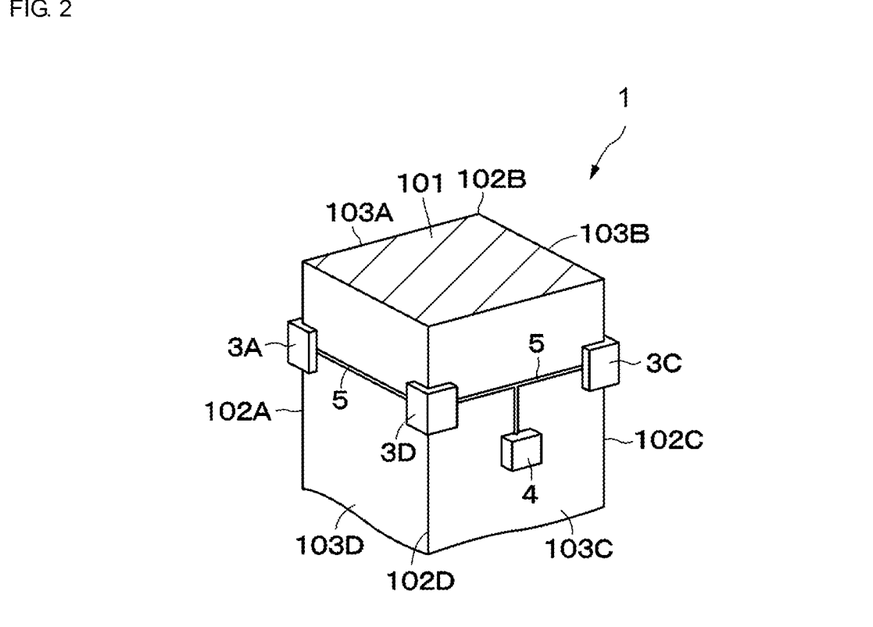
FIG. 2 is a perspective view of the state in which the position detecting system according to the first embodiment is attached to a pillar.
Figure 3:
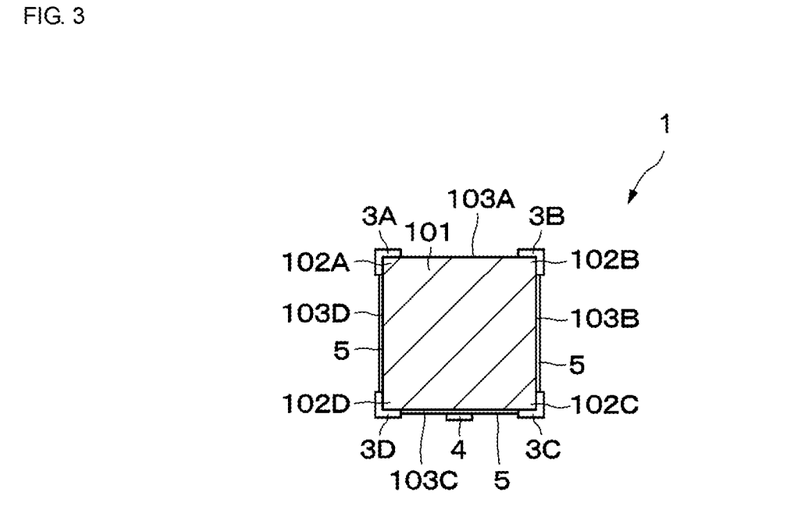
FIG. 3 is a plan view of the position detecting system in FIG. 2.

The pillar 101 is formed with a rectangular cross section. Accordingly, the pillar 101 has four corner portions 102A to 102D and four planar portions 103A to 103D. The four corner portions 102A to 102D are disposed clockwise in the circumferential direction of the pillar 101. Herein, the term "circumferential direction" (and other like terms, such as "circumferentially") refers to a region around a periphery of an object and is not intended to be limited only to circular or substantially round geometries. The planar portion 103A is positioned between the corner portion 102A and the corner portion 102B. The planar portion 103B is positioned between the corner portion 102B and the corner portion 102C. The planar portion 103C is positioned between the corner portion 102C and the corner portion 102D. The planar portion 103D is positioned between the corner portion 102D and the corner portion 102A.

Figure 1:
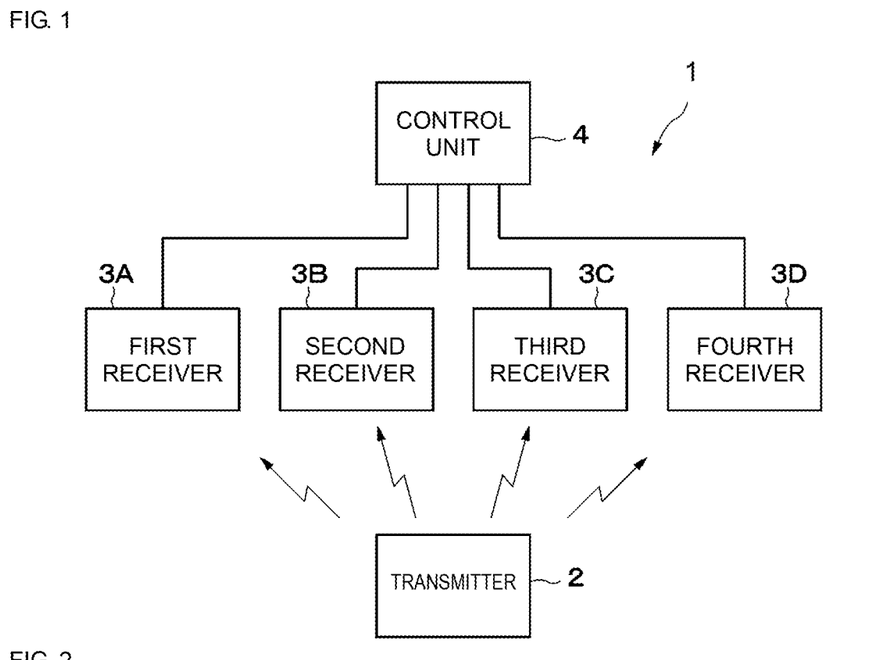
FIG. 1 is a block diagram illustrating the overall configuration of a position detecting system according to a first embodiment.

A transmitter 2, which is, for example, a movable wireless terminal that is to be detected, is a mobile station. The transmitter 2 includes an oscillator, a modulator, an amplifier, and an antenna (which are not illustrated). The transmitter 2 transmits radio waves, including various signals, to each of the receivers 3A to 3D. Radio waves transmitted by the transmitter 2 may be, for example, radio waves in the band (the 2.4-GHz band or the 5-GHz band) used in a wireless LAN or near field communication, or may be radio waves in a different frequency band.

First to fourth receivers 3A to 3D form fixed stations disposed at predetermined positions. These receivers 3A to 3D each include an oscillator, a demodulator, and an antenna (which are not illustrated). The first to fourth receivers 3A to 3D receive radio waves transmitted from the transmitter 2. The first to fourth receivers 3A to 3D operate in synchronization with one another, and detect the time at which a radio wave is received (the arrival time of a radio wave). The first to fourth receivers 3A to 3D output, to the control unit 4, signals (positioning data) corresponding to the arrival time of a radio wave transmitted from the transmitter 2. The four receivers 3A to 3D are attached at positions different from each other in the circumferential direction of the pillar 101 extending in the vertical direction.

Figure 4:
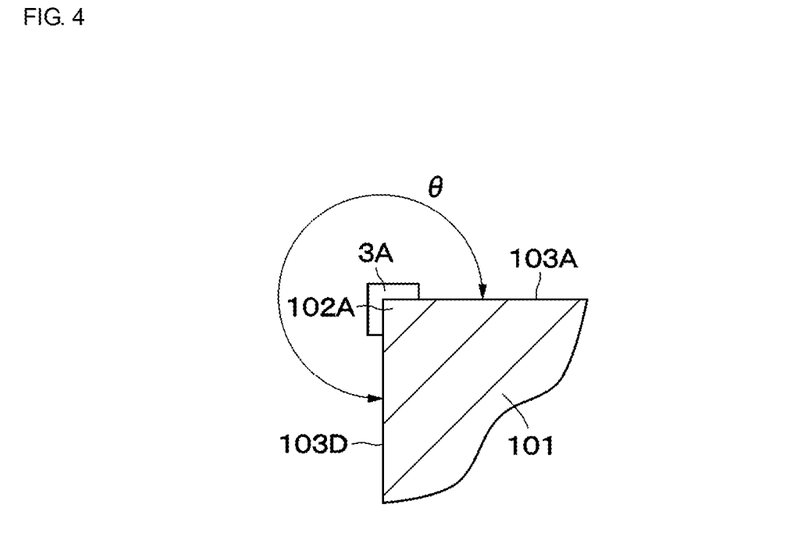
FIG. 4 is an enlarged plan view of a first receiver in FIG. 3.

As illustrated in FIGS. 2 and 3, the first receiver 3A is attached to the first corner portion 102A of the pillar 101. As illustrated in FIG. 4, the first receiver 3A is configured such that, when the pillar 101 is viewed in plan from above, radio waves from the transmitter 2 are directly received over an angular range 0 of 270°, which is obtained by excluding the part) (90°) occupied by the pillar 101, in the circumferential direction of the pillar 101.

As illustrated in FIGS. 2 and 3, the second receiver 3B is attached to the second corner portion 102B of the pillar 101. The first receiver 3A is configured such that, when the pillar 101 is viewed in plan from above, radio waves from the transmitter 2 are directly received over an angular range of 270°, which is obtained by excluding the part (90°) occupied by the pillar 101, in the circumferential direction of the pillar 101.

The third receiver 3C is attached to the third corner portion 102C of the pillar 101. The third receiver 3C is configured such that, when the pillar 101 is viewed in plan from above, radio waves from the transmitter 2 are directly received over an angular range of 270°, which is obtained by excluding the part (90°) occupied by the pillar 101, in the circumferential direction of the pillar 101.

The fourth receiver 3D is attached to the fourth corner portion 102D of the pillar 101. The fourth receiver 3D is configured such that, when the pillar 101 is viewed in plan from above, radio waves from the transmitter 2 are directly received over an angular range of 270°, which is obtained by excluding the part (90°) occupied by the pillar 101, in the circumferential direction of the pillar 101.

Figure 5:
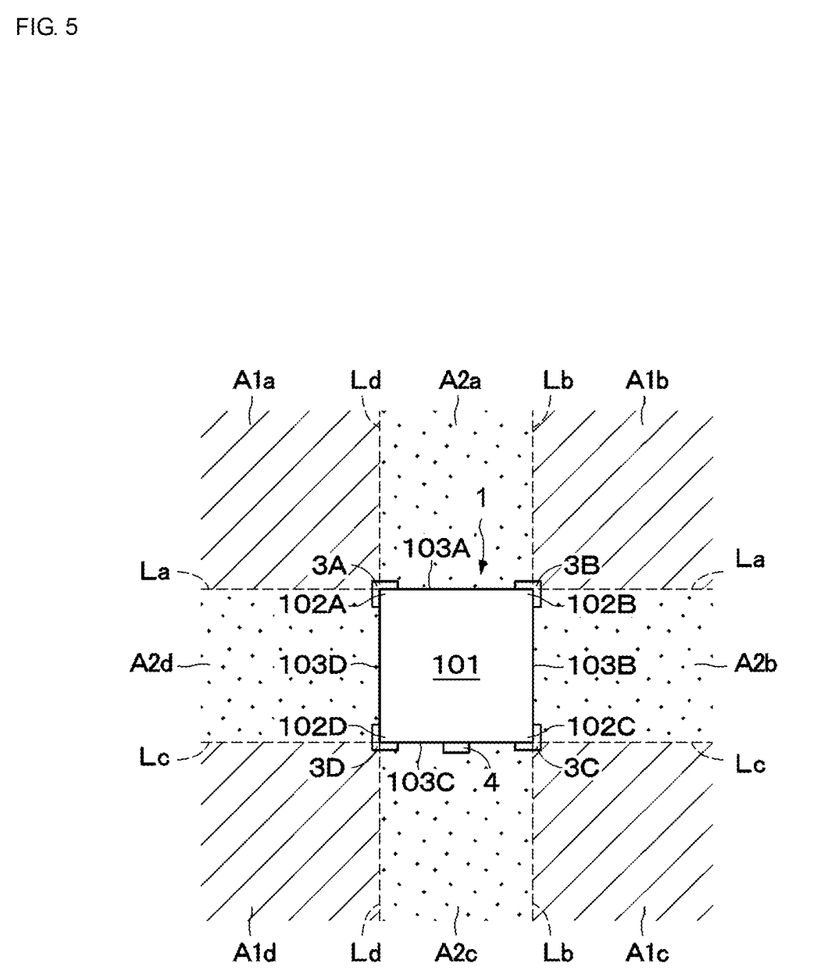
FIG. 5 is a diagram for describing first areas and second areas for the position detecting system in FIG. 2.

For the pillar 101 having a rectangular cross section, four areas expanding along the directions obtained by extending the diagonal lines of the pillar 101 form first areas A1$a$ to A1$d$. The first areas A1$a$ to A1$d$ are areas, in each of which radio waves from the transmitter 2 are received directly by the corresponding three receivers among the four receivers 3A to 3D, but not directly by the remaining one.

As illustrated in FIG. 5, the first area A1$a$ is an area expanding in the circumferential direction of the pillar 101 between the extended line La and the extended line Ld. The extended line La is obtained by extending the planar portion 103A of the pillar 101. The extended line Ld is obtained by extending the planar portion 103D of the pillar 101. When the transmitter 2 is disposed in the first area A1$a$, the first area A1$a$ forms an area (LOS), in which the first receiver 3A, the second receiver 3B, and the fourth receiver 3D receive radio waves from the transmitter 2 directly, and forms an area (NLOS), in which the third receiver 3C does not receive radio waves from the transmitter 2 directly.

The first area A1$b$ is an area expanding in the circumferential direction of the pillar 101 between the extended line La and the extended line Lb. The extended line La is obtained by extending the planar portion 103A of the pillar 101. The extended line Lb is obtained by extending the planar portion 103B of the pillar 101. When the transmitter 2 is disposed in the first area A1$b$, the first area A1$b$ forms an area, in which the first receiver 3A, the second receiver 3B, and the third receiver 3C receive radio waves from the transmitter 2 directly, and forms an area, in which the fourth receiver 3D does not receive radio waves from the transmitter 2 directly.

The first area A1$c$ is an area expanding in the circumferential direction of the pillar 101 between the extended line Lb and the extended line Lc. The extended line Lb is obtained by extending the planar portion 103B of the pillar 101. The extended line Lc is obtained by extending the planar portion 103C of the pillar 101. When the transmitter 2 is disposed in the first area A1$c$, the first area A1$c$ forms an area, in which the second receiver 3B, the third receiver 3C, and the fourth receiver 3D receive radio waves from the transmitter 2 directly, and forms an area, in which the first receiver 3A does not receive radio waves from the transmitter 2 directly.

The first area A1$d$ is an area expanding in the circumferential direction of the pillar 101 between the extended line Lc and the extended line Ld. The extended line Lc is obtained by extending the planar portion 103C of the pillar 101. The extended line Ld is obtained by extending the planar portion 103D of the pillar 101. When the transmitter 2 is disposed in the first area A1$d$, the first area A1$d$ forms an area, in which the third receiver 3C, the fourth receiver 3D, and the first receiver 3A receive radio waves from the transmitter 2 directly, and forms an area, in which the second receiver 3B does not receive radio waves from the transmitter 2 directly.

For the pillar 101 having a rectangular cross section, four areas facing the planar portions 103A to 103D of the pillar 101 form second areas A2$a$ to A2$d$. The second areas A2$a$ to A2$d$ are areas, in each of which radio waves from the transmitter 2 are received directly by the corresponding two receivers among the four receivers 3A to 3D, but not directly by the remaining two receivers.

Specifically, the second area A2$a$ is an area facing the planar portion 103A of the pillar 101. When the transmitter 2 is disposed in the second area A2$a$, the second area A2$a$ forms an area, in which the first receiver 3A and the second receiver 3B receive radio waves from the transmitter 2 directly, and forms an area, in which the third receiver 3C and the fourth receiver 3D do not receive radio waves from the transmitter 2 directly.

The second area A2$b$ is an area facing the planar portion 103B of the pillar 101. When the transmitter 2 is disposed in the second area A2$b$, the second area A2$b$ forms an area, in which the second receiver 3B and the third receiver 3C receive radio waves from the transmitter 2 directly, and forms an area, in which the fourth receiver 3D and the first receiver 3A do not receive radio waves from the transmitter 2 directly.

The second area A2$c$ is an area facing the planar portion 103C of the pillar 101. When the transmitter 2 is disposed in the second area A2$c$, the second area A2$c$ forms an area, in which the third receiver 3C and the fourth receiver 3D receive radio waves from the transmitter 2 directly, and forms an area, in which the first receiver 3A and the second receiver 3B do not receive radio waves from the transmitter 2 directly.

The second area A2$d$ is an area facing the planar portion 103D of the pillar 101. When the transmitter 2 is disposed in the second area A2$d$, the second area A2$d$ forms an area, in which the fourth receiver 3D and the first receiver 3A receive radio waves from the transmitter 2 directly, and forms an area, in which the second receiver 3B and the third receiver 3C do not receive radio waves from the transmitter 2 directly.

The control unit 4, which is attached to the pillar 101, is connected to the receivers 3A to 3D by using cables 5 by wires. For example, the control unit 4 outputs reference signals and the like to the receivers 3A to 3D, and synchronizes the receivers 3A to 3D. In addition to this, the control unit 4 performs data communication among the receivers 3A to 3D, and obtains information about the arrival time of a radio wave transmitted from the transmitter 2. Further, the control unit 4 supplies driving power to the receivers 3A to 3D. Furthermore, the control unit 4 calculates the position (coordinates) of the transmitter 2 by using a position computational algorithm for the first areas A1a to A1d and a different position computational algorithm for the second areas A2a to A2d. Specifically, when the transmitter 2 is disposed in the first areas A1a to A1d, the control unit 4 calculates the position of the transmitter 2 by using a position detection algorithm according to the TDOA method. In contrast, when the transmitter 2 is disposed in the second areas A2a to A2d, in addition to calculation of the position using the TDOA method, the control unit 4 calculates the position of the transmitter 2 by using a position detection algorithm which refers to information about AOA.

In the first embodiment, for the second areas A2a to A2d, the control unit 4 determines the position of the transmitter 2 by using, in addition to TDOA, a position detection algorithm referring to information about AOA. However, the present disclosure is not limited to this. For example, the control unit 4 may determine the distance to the transmitter 2 on the basis of the reception strength (RSSI: Received Signal Strength Indicator) and/or the time of arrival (TOF: Time of Flight) of a radio wave from the transmitter 2. Therefore, for the second areas A2a to A2d, in addition to calculation of the position using the TDOA method, the control unit 4 may determine the position of the transmitter 2 by using a position detection algorithm referring to information about the distance to the transmitter 2 which is obtained by using RSSI and/or TOF. In addition, for the second areas A2a to A2d, in addition to information about TDOA and AOA, the control unit 4 may use a position detection algorithm referring information about the distance to the transmitter 2.

The position detecting system 1 according to the first embodiment has the configuration described above. Operations of the position detecting system 1 will be described below by referring to FIGS. 6 and 7.

Figure 6:
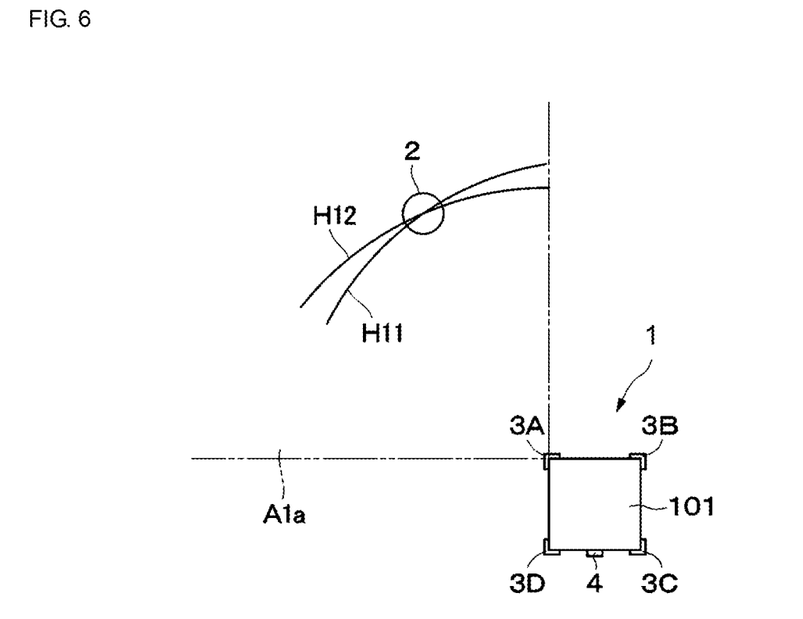
FIG. 6 is a diagram for describing the case in which the position detecting system in FIG. 2 determines the position of a transmitter in a first area.

When the transmitter 2 is disposed in the first areas A1a to A1d, the control unit 4 calculates the position of the transmitter 2 by using a position detection algorithm which is the TDOA method, the AOA method, or a combination of both. As illustrated in FIG. 6, for example, in the first area A1a, the three receivers 3A, 3B, and 3D receive radio waves from the transmitter 2 directly. Therefore, for example, in the case where the position of the transmitter 2 is calculated by using the TDOA method, when the two receivers 3A and 3B receive a radio wave from the transmitter 2, the control unit 4 obtains a hyperbola H11, indicating the possible position of the transmitter 2, on the basis of the difference in time of arrival of the radio wave. Similarly, when the two receivers 3A and 3D receive a radio wave from the transmitter 2, the control unit 4 obtains a hyperbola H12, indicating the possible position of the transmitter 2, on the basis of the difference in time of arrival of the radio wave. The control unit 4 calculates the position of the transmitter 2 by using the intersection point of the two hyperbolas H11 and H12.

In the case where the position of the transmitter 2 is calculated by using the AOA method, when the two receivers 3A and 3B receive a radio wave from the transmitter 2, the control unit 4 obtains a first angle line, extending along the angle of arrival of the radio wave, on the basis of the difference in time of arrival of the radio wave. Similarly, when the two receivers 3A and 3D receive a radio wave from the transmitter 2, the control unit 4 obtains a second angle line, extending along the angle of arrival of the radio wave, on the basis of the difference in time of arrival of the radio wave. The control unit 4 calculates the position of the transmitter 2 by using the intersection point of the two angle lines. When the TDOA method and the AOA method are combined together, the position of the transmitter 2 is calculated by using the intersection point of the hyperbolas obtained by using the TDOA method and the angle lines obtained by using the AOA method. The case in which the transmitter 2 is disposed in the first area A1a is described above as an example. The same is true for the cases in which the transmitter 2 is disposed in the first areas A1b to A1d.

Figure 7:
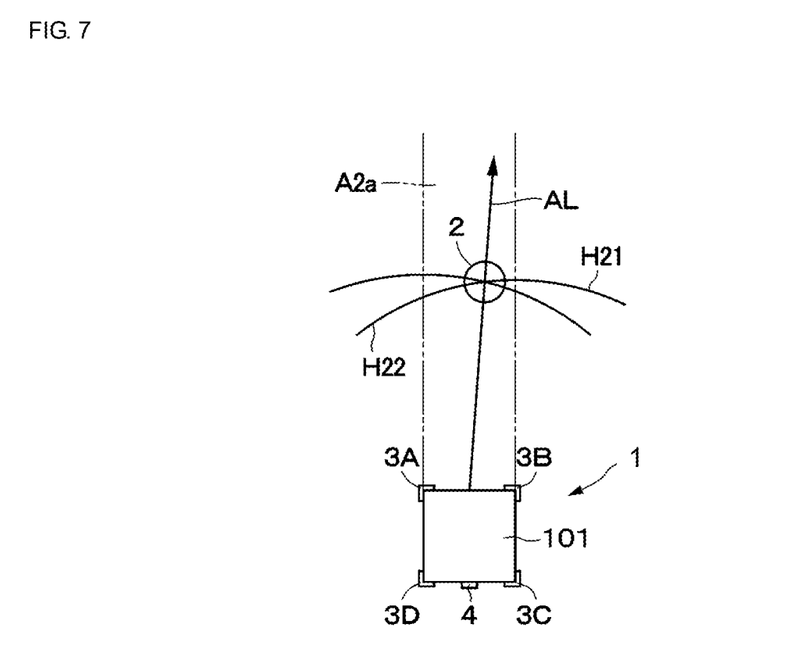
FIG. 7 is a diagram for describing the case in which the position detecting system in FIG. 2 determines the position of a transmitter in a second area.

In contrast, when the transmitter 2 is disposed in the second areas A2a to A2d, in addition to calculation of the position using the TDOA method, the control unit 4 calculates the position of the transmitter 2 by referring to information about AOA. As illustrated in FIG. 7, for example, in the second area A2a, the two receivers 3A and 3B receive radio waves from the transmitter 2 directly. At that time, the remaining two receivers 3C and 3D do not receive radio waves from the transmitter 2 directly, and receive diffracted waves. Therefore, when the two receivers 3A and 3D receive a radio wave from the transmitter 2, the control unit 4 obtains a hyperbola H21, indicating the possible position of the transmitter 2, on the basis of the difference in time of arrival of the radio wave. Similarly, when the two receivers 3B and 3C receive a radio wave from the transmitter 2, the control unit 4 obtains a hyperbola H22, indicating the possible position of the transmitter 2, on the basis of the difference in time of arrival of the radio wave.

However, the hyperbolas H21 and H22 use information from the receivers 3C and 3D which are in the NLOS environment, causing the accuracy to be decreased. Therefore, when the two receivers 3A and 3B receive a radio wave from the transmitter 2, the control unit 4 obtains an angle line AL, extending along the angle of arrival (AOA) of the radio wave, on the basis of the difference in time of arrival of the radio wave. The control unit 4 calculates the position of the transmitter 2 by using the intersection point of the two hyperbolas H21 and H22 and the angle line AL. The control unit 4 may calculate the position of the transmitter 2 by using the intersection point of one of the hyperbolas H21 and H22 and the angle line AL. The case in which the transmitter 2 is disposed in the second area A2a is described above as an example. The same is true for the cases in which the transmitter 2 is disposed in the second areas A2b to A2d.

According to the first embodiment, the four receivers 3A to 3D are attached to the pillar 101. Compared with the case in which multiple receivers are disposed far apart, the receivers 3A to 3D may be easily connected to the control unit 4 by using the cables 5. Therefore, construction cost for the system installation may be reduced, enabling the system to be constructed at low cost. In addition to this, the receivers 3A to 3D are connected to the control unit 4 by using the cables 5 by wires. Compared with the case of wireless connection, the control unit 4 may collect positioning data of the transmitter 2 without an influence from nearby data communication.

In addition to this, the four receivers 3A to 3D are attached at positions different from each other in the circumferential direction of the pillar 101. This enables the receivers 3A to 3D, which receive a radio wave from the transmitter 2, to detect the position of the transmitter 2. At that time, each of the first areas A1a to A1d is an area in which the corresponding three receivers among the receivers 3A to 3D receive radio waves from the transmitter 2 directly. Therefore, for example, when the transmitter 2 is positioned in the first area A1a the control unit 4 may determine the position of the transmitter 2 in the first area A1a by using a position detection algorithm using information from the three receivers 3A, 3B, and 3D which are in the LOS environment.

Specifically, for example, when the transmitter 2 is positioned in the first area A1a, the control unit 4 determines the position of the transmitter 2 in the first area A1a by using a position detection algorithm which is the TDOA method, the AOA method, or a combination of both. That is, the control unit 4 may determine the position of the transmitter 2 in the first area A1a on the basis of the difference in time of arrival (information) obtained when a radio wave from the transmitter 2 is received by the three receivers 3A, 3B, and 3D which are in the LOS environment. Similarly, when the transmitter 2 is disposed in the first areas A1b to A1d, the position of the transmitter 2 in the first areas A1a to A1d may be determined.

In contrast, each of the second areas A2a to A2d is an area in which the corresponding two receivers among the receivers 3A to 3D receive radio waves from the transmitter 2 directly. For example, when the transmitter 2 is positioned in the second area A2a, the two receivers 3A and 3B receive radio waves from the transmitter 2 directly. The remaining receivers 3C and 3D are positioned in areas in which radio waves from the transmitter 2 are not received directly. Therefore, it is not possible to determine the position of the transmitter 2 only by using information from the two receivers 3A and 3B which are in the LOS environment. At that time, the control unit 4 may determine the position of the transmitter 2 in the second area A2a by using a position detection algorithm obtained by combining information from the receivers 3A and 3B, which are in the LOS environment, and information from the receivers 3C and 3D, which are in the NLOS environment.

Specifically, for example, when the transmitter 2 is positioned in the second area A2a, the angle of arrival (AOA) of a radio wave may be estimated on the basis of direct waves received by the two receivers 3A and 3B. Thus, the position of the transmitter 2 in the second area A2a may be determined by using a position detection algorithm obtained by combining information of the angle of arrival of a radio wave with TDOA. Similarly, when the transmitter 2 is disposed in the second areas A2b to A2d, the position of the transmitter 2 in the second areas A2b to A2d may be determined. As a result, the position of the transmitter 2 may be detected with high accuracy in both of the first areas A1a to A1d and the second areas A2b to A2d.

The receivers 3A to 3D are attached to the corner portions 102A to 102D of the pillar 101 having a rectangular cross section. Compared with the case in which the receivers 3A to 3D are attached to the planar portions 103A to 103D of the pillar 101, the angular range which is in the LOS environment may be extended. That is, each of the receivers 3A to 3D attached to the corresponding one of the corner portions 102A to 102D of the pillar 101 may receive radio waves from the transmitter 2 over an angular range (for example, 270°) larger than 180°. Therefore, the receivers 3A to 3D whose number is small (4 receivers) are used to receive radio waves from the transmitter 2 in the entire area around the pillar 101.

The area in which the receivers 3A to 3D are in the LOS environment may be extended. Thus, the first areas A1b to A1d may be formed in such a manner that the areas in which the respective receivers 3A to 3D are in the LOS environment may overlap with each other. Further, the four receivers 3A to 3D are attached to the corner portions 102A to 102D, respectively, of the pillar 101. Compared with the second areas A2b to A2d, the first areas A1b and A1d may be made wider. At that time, the first areas A1b to A1d are areas in which the position of the transmitter 2 may be detected with higher accuracy than the second areas A2b to A2d. Therefore, the probability in which the transmitter 2 is positioned in the first areas A1b to A1d may be increased, and the accuracy of the position of the transmitter 2 may be improved.

Figure 8:
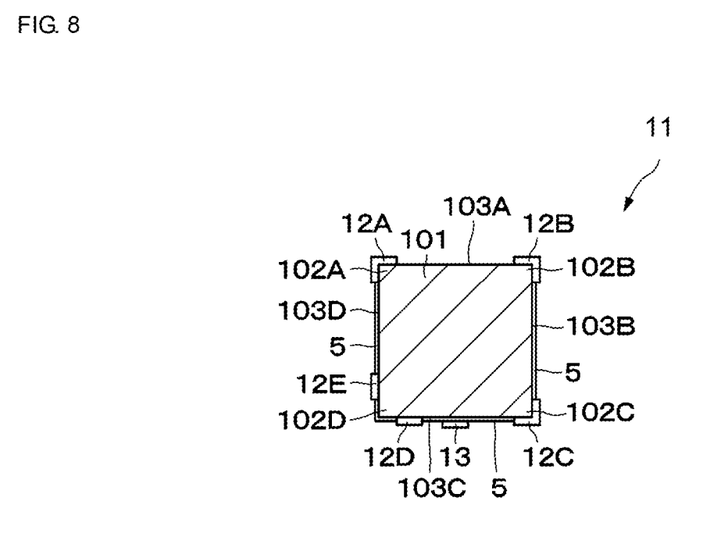
FIG. 8 is a plan view of a position detecting system according to a second embodiment.
Figure 9:
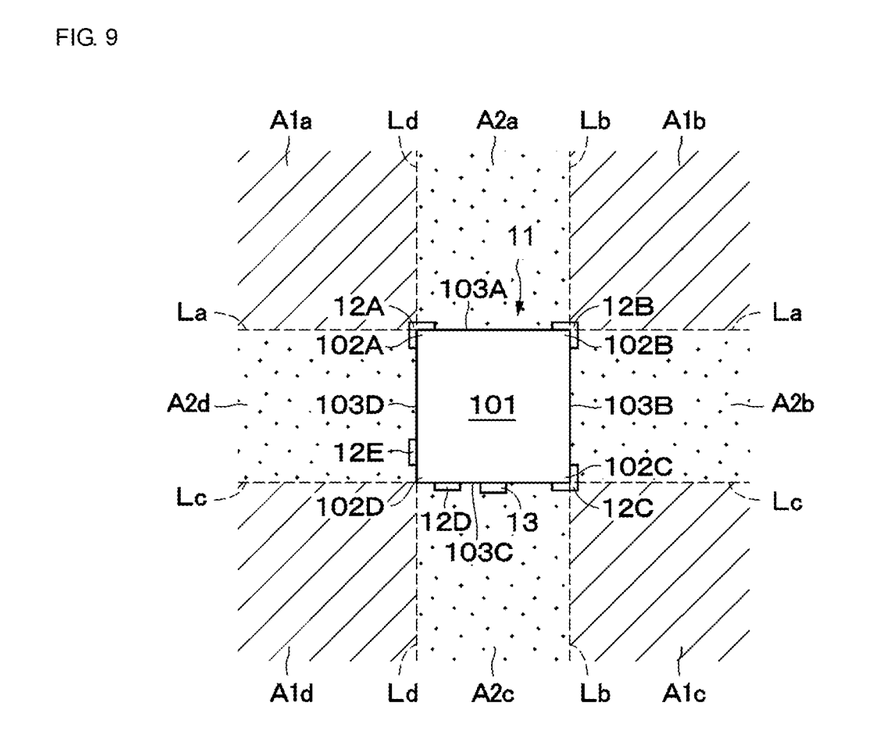
FIG. 9 is a diagram for describing first areas and second areas for the position detecting system in FIG. 8.

FIGS. 8 and 9 illustrate a position detecting system according to a second embodiment of the present disclosure. The second embodiment is characterized in that some of the receivers are attached to planar portions of a pillar. In the second embodiment, the same configuration as that of the first embodiment is designated with the same reference characters, and will not be described.

A position detecting system 11 according to the second embodiment has a substantially similar configuration to that of the position detecting system 1 according to the first embodiment. Therefore, the position detecting system 11 includes receivers 12A to 12E and a control unit 13. The two receivers 12D and 12E of the five receivers 12A to 12E are attached to the planar portions 103D and 103A of the pillar 101. The second embodiment is different from the first embodiment in this point.

The first to fifth receivers 12A to 12E each have a substantially similar configuration to that of the first to fourth receivers 3A to 3D according to the first embodiment. The first receiver 12A is attached to the corner portion 102A of the pillar 101. The second receiver 12B is attached to the second corner portion 102B of the pillar 101. The third receiver 12C is attached to the third corner portion 102C of the pillar 101.

The fourth receiver 12D is attached to the third planar portion 103C of the pillar 101. The fifth receiver 12E is attached to the fourth planar portion 103D of the pillar 101.

In this case, when the transmitter 2 is disposed in the first area A1a, the first area A1a forms an area, in which the first receiver 12A, the second receiver 12B, and the fifth receiver 12E receive radio waves from the transmitter 2 directly, and forms an area, in which the third receiver 12C and the fourth receiver 12D do not receive radio waves from the transmitter 2 directly.

When the transmitter 2 is disposed in the first area A1b, the first area A1b forms an area, in which the first receiver 12A, the second receiver 12B, and the third receiver 12C receive radio waves from the transmitter 2 directly, and forms an area, in which the fourth receiver 12D and the fifth receiver 12E do not receive radio waves from the transmitter 2 directly.

When the transmitter 2 is disposed in the first area A1c, the first area A1c forms an area, in which the second receiver 12B, the third receiver 12C, and the fourth receiver 12D receive radio waves from the transmitter 2 directly, and forms an area, in which the first receiver 12A and the fifth receiver 12E do not receive radio waves from the transmitter 2 directly.

When the transmitter 2 is disposed in the first area A1d, the first area A1d forms an area, in which the third receiver 12C, the fourth receiver 12D, the fifth receiver 12E, and the first receiver 12A receive radio waves from the transmitter 2 directly, and forms an area, in which the second receiver 12B does not receive radio waves from the transmitter 2 directly.

In contrast, when the transmitter 2 is disposed in the second area A2a, the second area A2a forms an area, in which the first receiver 12A and the second receiver 12B receive radio waves from the transmitter 2 directly, and forms an area, in which the third receiver 12C, the fourth receiver 12D, and the fifth receiver 12E do not receive radio waves from the transmitter 2 directly.

When the transmitter 2 is disposed in the second area A2b, the second area A2b forms an area, in which the second receiver 12B and the third receiver 12C receive radio waves from the transmitter 2 directly, and forms an area, in which the fourth receiver 12D, the fifth receiver 12E, and the first receiver 12A do not receive radio waves from the transmitter 2 directly.

When the transmitter 2 is disposed in the second area A2c, the second area A2c forms an area, in which the third receiver 12C and the fourth receiver 12D receive radio waves from the transmitter 2 directly, and forms an area, in which the first receiver 12A, the second receiver 12B, and the fifth receiver 12E do not receive radio waves from the transmitter 2 directly.

When the transmitter 2 is disposed in the second area A2d, the second area A2d forms an area, in which the fifth receiver 12E and the first receiver 12A receive radio waves from the transmitter 2 directly, and forms an area, in which the second receiver 12B, the third receiver 12C, and the fourth receiver 12D do not receive radio waves from the transmitter 2 directly.

The control unit 13, which is attached to the pillar 101, is connected to the receivers 12A to 12E by using the cables 5 by wires. The control unit 13 has a substantially similar configuration to that of the control unit 4 according to the first embodiment. Therefore, the control unit 13 synchronizes the receivers 12A to 12E, performs data communication among the receivers 12A to 12E, and supplies driving power to the receivers 12A to 12E. When the transmitter 2 is disposed in the first areas A1a to A1d, the control unit 13 calculates the position of the transmitter 2 by using a position detection algorithm which is the TDOA method, the AOA method, or a combination of both. In contrast, when the transmitter 2 is disposed in the second areas A2a to A2d, in addition to calculation of the position using the TDOA method, the control unit 13 calculates the position of the transmitter 2 by using a position detection algorithm referring to information about AOA.

Accordingly, the second embodiment may also obtain substantially similar effects to those of the first embodiment.

In the second embodiment, the single receiver 12D is attached to the planar portion 103C of the pillar 101, and the single receiver 12E is attached to the planar portion 103D. The present disclosure is not limited to this. Multiple receivers may be attached to each of the planar portions 103A to 103D at different positions in the circumferential direction of the pillar 101. In the case where multiple receivers are attached to each of planar portions 103A to 103D, receivers are not necessarily attached to the corner portions 102A to 102D.

Figure 10:
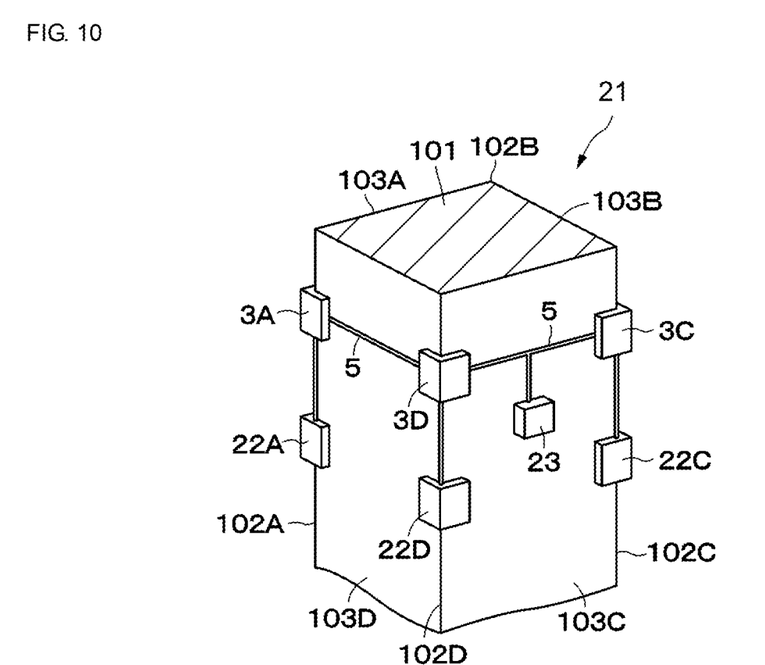
FIG. 10 is a perspective view of the state in which a position detecting system according to a third embodiment is attached to a pillar.
Figure 11:
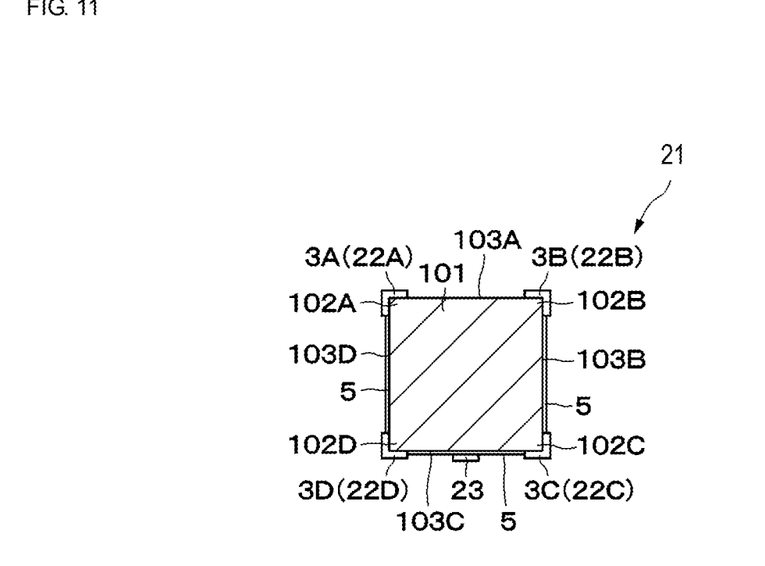
FIG. 11 is a plan view of the position detecting system in FIG. 10.

FIGS. 10 and 11 illustrate a position detecting system according to a third embodiment of the present disclosure. The third embodiment is characterized in that different receivers are attached to a pillar at positions which are the same as those of the receivers in the circumferential direction and which are different in the vertical direction. In the third embodiment, the same configuration as that of the first embodiment is designated with the same reference characters, and will not be described.

A position detecting system 21 according to the third embodiment has a substantially similar configuration to that of the position detecting system 1 according to the first embodiment. Therefore, the position detecting system 21 includes receivers 3A to 3D and 22A to 22D and a control unit 23. However, the different receivers 22A to 22D are attached to the pillar 101 at positions which are the same as those of the receivers 3A to 3D in the circumferential direction and which are different in the vertical direction. The third embodiment is different from the first embodiment in this point. At that time, the different receivers 22A to 22D each have a substantially similar configuration to that of the receivers 3A to 3D.

FIG. 10 illustrates the case in which the different receivers 22A to 22D are disposed on the lower side of the receivers 3A to 3D. The present disclosure is not limited to this. The different receivers 22A to 22D may be disposed on the upper side of the receivers 3A to 3D.

The control unit 23, which is attached to the pillar 101, is connected to the receivers 3A to 3D and 22A to 22D by using the cables 5 by wires. The control unit 23 has a substantially similar configuration to that of the control unit 4 according to the first embodiment. Therefore, the control unit 23 synchronizes the receivers 3A to 3D and 22A to 22D, performs data communication among the receivers 3A to 3D and 22A to 22D, and supplies driving power to the receivers 3A to 3D and 22A to 22D. When the transmitter 2 is disposed in the first areas A1a to A1d, the control unit 23 calculates the position of the transmitter 2 by using a position detection algorithm which is the TDOA method, the AOA method, or a combination of both. In contrast, when the transmitter 2 is disposed in the second areas A2a to A2d, in addition to calculation of the position using the TDOA method, the control unit 23 calculates the position by using a position detection algorithm referring to information about AOA.

Thus, the third embodiment may also obtain substantially similar effects to those of the first embodiment. The different receivers 22A to 22D are attached to the pillar 101 at positions that are the same as those of the receivers 3A to 3D in the circumferential direction and that are different in the vertical direction. Therefore, for example, even when radio waves from the transmitter 2 are made weak at the receiver 3A due to multi-path fading, the radio waves from the transmitter 2 may be made strong at the receiver 22A. Thus, the number of alternatives of the receivers 3A to 3D and 22A to 22D is increased. Therefore, by selecting receivers which are in the LOS environment, degradation in accuracy of position detection based on an error in received data may be suppressed. In addition, data received by the receivers 3A to 3D and data received by the different receivers 22A to 22D may be used to also detect the three-dimensional position of the transmitter 2. To enhance the effects described above, longer distances between the receivers 3A to 3D and the receivers 22A to 22D in the vertical direction are preferable.

Figure 12:
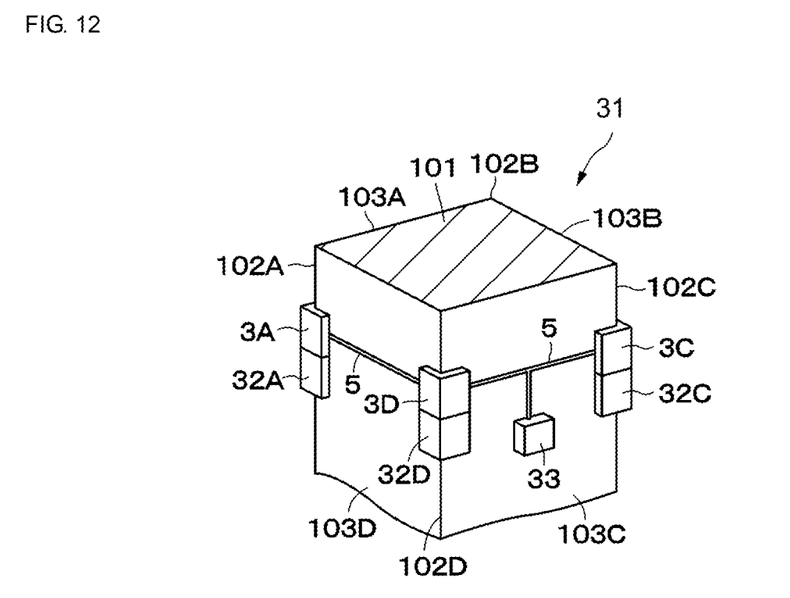
FIG. 12 is a perspective view of the state in which a position detecting system according to a fourth embodiment is attached to a pillar.
Figure 13:
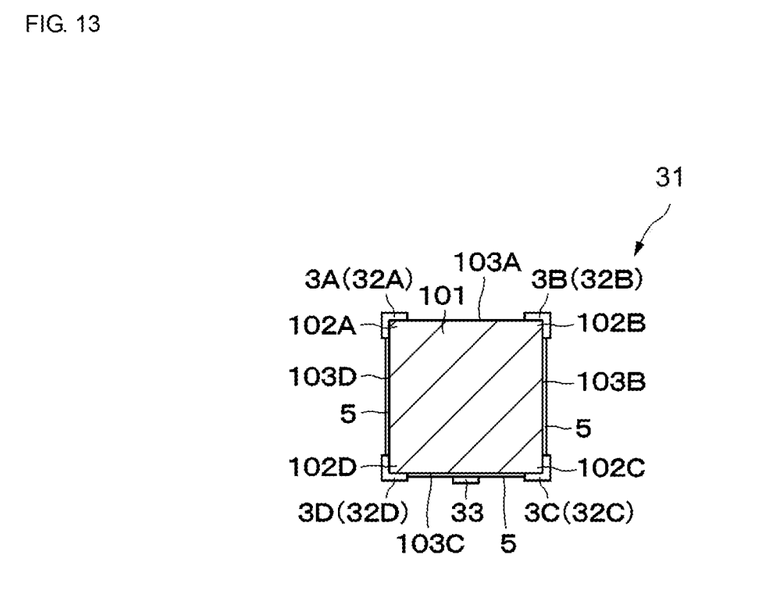
FIG. 13 is a plan view of the position detecting system in FIG. 12.

FIGS. 12 and 13 illustrate a position detecting system according to a fourth embodiment of the present disclosure. The fourth embodiment is characterized in that different position detection algorithms are applied to the receivers and the different receivers, which are attached at different positions in the vertical direction. In the fourth embodiment, the same configuration as that of the first embodiment is designated with the same reference characters, and will not be described.

A position detecting system 31 according to the fourth embodiment has a substantially similar configuration to that of the position detecting system 1 according to the first embodiment. Therefore, the position detecting system 31 includes receivers 3A to 3D and 32A to 32D and a control unit 33. The different receivers 32A to 32D are attached to the pillar 101 at positions that are the same as those of the receivers 3A to 3D in the circumferential direction and that are different in the vertical direction. The fourth embodiment is different from the first embodiment in this point. A position detection algorithm different from that for the receivers 3A to 3D is applied to the different receivers 32A to 32D.

For example, the receivers 3A to 3D, which are used, for example, in Wi-Fi®, output positioning data based on a position detection algorithm according to the TDOA method. In contrast, the receivers 32A to 32D, which are used, for example, in Bluetooth®, output positioning data based on a position detection algorithm using AOA.

FIG. 12 illustrates the case in which the different receivers 32A to 32D are disposed on the lower side of the receivers 3A to 3D. The present disclosure is not limited to this. The different receivers 32A to 32D may be disposed on the upper side of the receivers 3A to 3D. FIG. 12 illustrates the case in which the different receivers 32A to 32D and the receivers 3A to 3D are disposed at adjacent positions. The present disclosure is not limited to this. The different receivers 32A to 32D and the receivers 3A to 3D may be disposed so that the different receivers 32A to 32D are separated from the receivers 3A to 3D in the vertical direction.

The control unit 33, which is attached to the pillar 101, is connected to the receivers 3A to 3D and 32A to 32D by using the cables 5 by wires. The control unit 33 has a substantially similar configuration to that of the control unit 4 according to the first embodiment. Therefore, the control unit 33 synchronizes the receivers 3A to 3D and 32A to 32D, performs data communication among the receivers 3A to 3D and 32A to 32D, and supplies driving power to the receivers 3A to 3D and 32A to 32D. When the transmitter 2 is disposed in the first areas A1$a$ to A1$d$, the control unit 33 calculates the position of the transmitter 2 by using a position detection algorithm according to the TDOA method on the basis of information (positioning data) from the receivers 3A to 3D. In contrast, when the transmitter 2 is disposed in the second areas A2$a$ to A2$d$, in addition to calculation of the position using the TDOA method based on information (positioning data) from the receivers 3A to 3D, the control unit 23 refers to information (positioning data) about AOA from the receivers 32A to 32D, and calculates the position of the transmitter 2 by using a position detection algorithm obtained by combining these.

Thus, the fourth embodiment may also obtain substantially similar effects to those of the first embodiment. In addition, different position detection algorithms are applied to the receivers 3A to 3D and the different receivers 32A to 32D. Thus, existing receivers suitable for a position detection algorithm may be selected. Compared with the case in which receivers compatible with multiple position detection algorithms are included, an inexpensive system may be configured.

Figure 14:
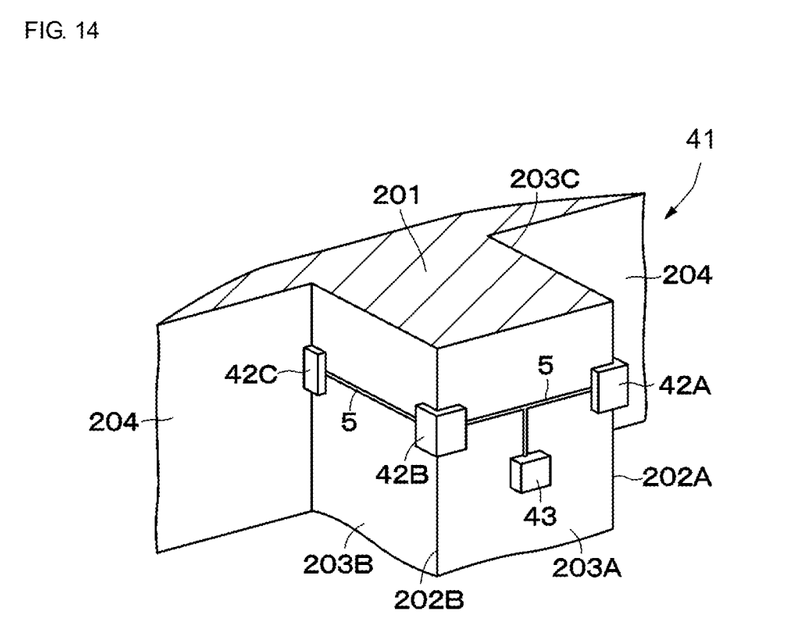
FIG. 14 is a perspective view of the state in which a position detecting system according to a fifth embodiment is attached to a pillar (protrusion) coming out of an integrated wall.
Figure 15:
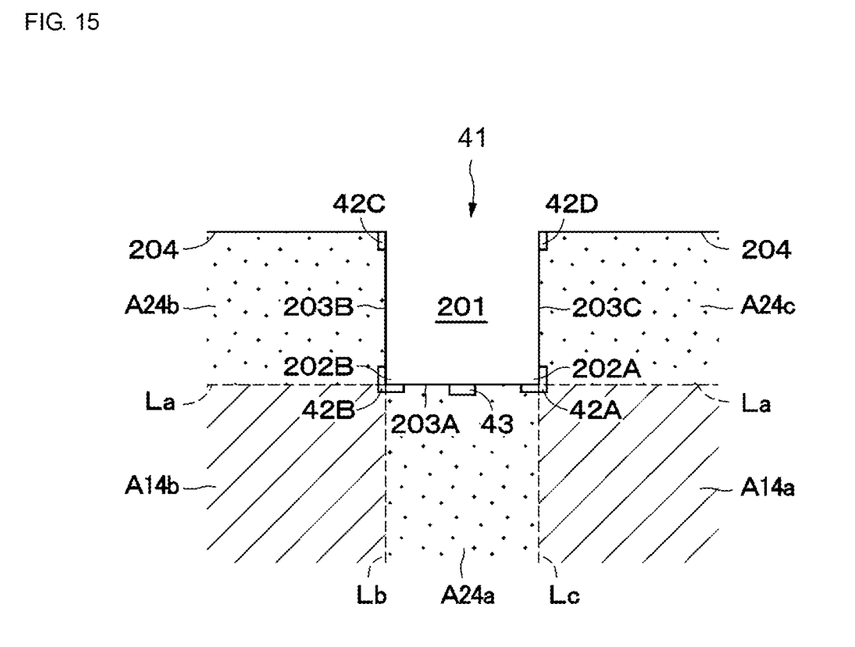
FIG. 15 is a diagram for describing first areas and second areas for the position detecting system in FIG. 14.

FIGS. 14 and 15 illustrate a position detecting system according to a fifth embodiment of the present disclosure. The fifth embodiment is characterized in that multiple receivers are attached to a pillar (protrusion) whose surface is in contact with a wall. In the fifth embodiment, the same configuration as that of the first embodiment is designated with the same reference characters, and will not be described.

A position detecting system 41 according to the fifth embodiment has a substantially similar configuration to that of the position detecting system 1 according to the first embodiment. Thus, the position detecting system 41 includes receivers 42A to 42D and a control unit 43.

A pillar (protrusion) 201 having a rectangular cross section has one surface which is in contact with a wall 204, and the pillar (protrusion) 201 is integrated with the wall 204. Thus, the pillar (protrusion) 201 includes two corner portions 202A to 202D and three planar portions 203A to 203D. At that time, the planar portion 203A is positioned between the corner portion 202A and the corner portion 202B; the planar portion 203B is positioned between the corner portion 202B and the wall 204; the planar portion 203C is positioned between the corner portion 202A and the wall 204.

The receivers 42A to 42D each have a substantially similar configuration to that of the receivers 3A to 3D according to the first embodiment. The first receiver 42A is attached to the first corner portion 202A of the pillar (protrusion) 201. The second receiver 42B is attached to the second corner portion 202B of the pillar (protrusion) 201. In contrast, the third receiver 42C is attached to the planar portion 203B of the pillar (protrusion) 201. The fourth receiver 42D is attached to the planar portion 203C of the pillar (protrusion) 201.

As illustrated in FIG. 15, a first area A14$a$ is an area expanding in the circumferential direction of the pillar (protrusion) 201 between the extended line La and the extended line Lc. The extended line La is obtained by extending the planar portion 203A of the pillar (protrusion) 201. The extended line Lc is obtained by extending the planar portion 203C of the pillar (protrusion) 201. When the transmitter 2 is disposed in the first area A14$a$, the first area A14$a$ forms an area, in which the first receiver 42A, the second receiver 42B, and the fourth receiver 42D receive radio waves from the transmitter 2 directly, and forms an area, in which the third receiver 42C does not receive radio waves from the transmitter 2 directly.

A first area A14$b$ is an area expanding in the circumferential direction of the pillar (protrusion) 201 between the extended line La and the extended line Lb. The extended line La is obtained by extending the planar portion 203A of the pillar (protrusion) 201. The extended line Lb is obtained by extending the planar portion 203B of the pillar (protrusion) 201. When the transmitter 2 is disposed in the first area A14$b$, the first area A14$b$ forms an area, in which the first receiver 42A, the second receiver 42B, and the third receiver 42C receive radio waves from the transmitter 2 directly, and forms an area, in which the fourth receiver 42D does not receive radio waves from the transmitter 2 directly.

In contrast, the three areas facing the planar portions 203A to 203D of the pillar (protrusion) 201 are second areas A24$a$ to A24$c$. Each of these second areas A24$a$ to A24$c$ is an area in which the corresponding two receivers among the four receivers 42A to 42D receive radio waves from the transmitter 2 directly, and is an area in which the remaining two do not receive radio waves from the transmitter 2 directly.

Specifically, the second area A24a is an area facing the planar portion 203A of the pillar (protrusion) 201. When the transmitter 2 is disposed in the second area A24a, the second area A24a forms an area, in which the first receiver 42A and the second receiver 42B receive radio waves from the transmitter 2 directly, and forms an area, in which the third receiver 42C and the fourth receiver 42D do not receive radio waves from the transmitter 2 directly.

The second area A24b is an area facing the planar portion 203B of the pillar (protrusion) 201. When the transmitter 2 is disposed in the second area A24b, the second area A24b forms an area, in which the second receiver 42B and the third receiver 42C receive radio waves from the transmitter 2 directly, and forms an area, in which the fourth receiver 42D and the first receiver 42A do not receive radio waves from the transmitter 2 directly.

The second area A24c is an area facing the planar portion 203C of the pillar (protrusion) 201. When the transmitter 2 is disposed in the second area A24c, the second area A24c forms an area, in which the first receiver 42A and the fourth receiver 42D receive radio waves from the transmitter 2 directly, and forms an area, in which the second receiver 42B and the third receiver 42C do not receive radio waves from the transmitter 2 directly.

The control unit 43, which is attached to the pillar (protrusion) 201, is connected to the receivers 42A to 42D by using the cables 5 by wires. The control unit 43 has a substantially similar configuration to that of the control unit 4 according to the first embodiment. Therefore, the control unit 43 synchronizes the receivers 42A to 42D, performs data communication among the receivers 42A to 42D, and supplies driving power to the receivers 42A to 42D. When the transmitter 2 is disposed in the first areas A14a and A14b, the control unit 43 calculates the position of the transmitter 2 by using a position detection algorithm which is the TDOA method, the AOA method, or a combination of both. In contrast, when the transmitter 2 is disposed in the second areas A24a to A24c, in addition to calculation of the position using the TDOA method, the control unit 23 calculates the position of the transmitter 2 by using a position detection algorithm referring to information about AOA.

Thus, the fifth embodiment may also obtain substantially similar effects to those of the first embodiment.

Figure 16:
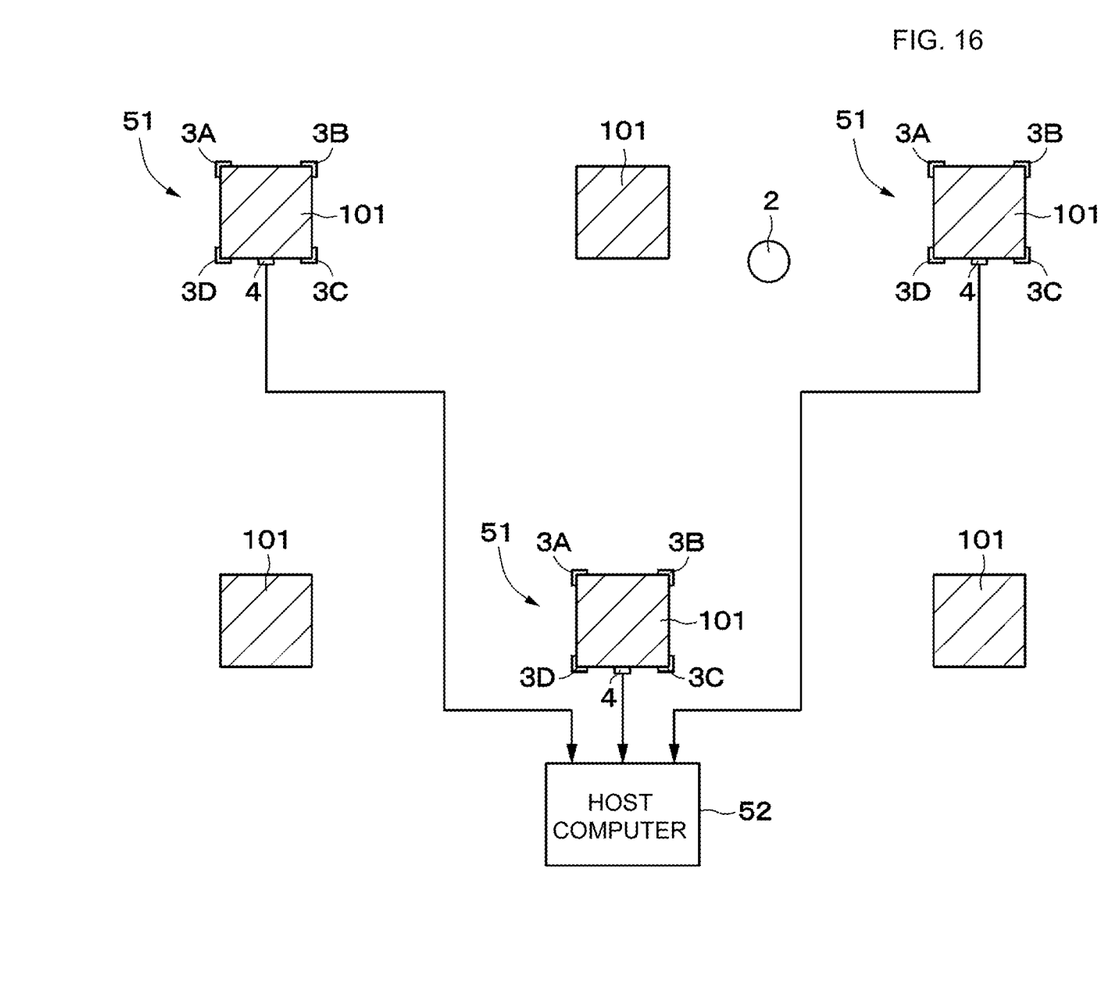
FIG. 16 is a plan view of a position detecting system according to a sixth embodiment.

FIG. 16 illustrates a position detecting system according to a sixth embodiment of the present disclosure. The sixth embodiment is characterized in that position detecting systems are used on multiple pillars, and that the control units of the position detecting systems are connected to a host computer. In the sixth embodiment, the same configuration as that of the first embodiment is designated with the same reference characters, and will not be described.

For example, in a large building, such as a factory or a shopping center, multiple pillars 101 (only six pillars are illustrated) are disposed in a room. Among these, position detecting systems 51 are used on any number of pillars 101 (for example, three). At that time, each of the position detecting systems 51, which has, for example, a similar configuration to that of the position detecting system 1 according to the first embodiment, includes the receivers 3A to 3D and the control unit 4. In addition to this, the control units 4 of the position detecting systems 51 are connected to a host computer 52. At that time, the host computer 52 receives information about the position of the transmitter 2 from the multiple control units 4. Therefore, the host computer 52 selects an optimal position detecting system 51 for detection of the position of the transmitter 2. Specifically, the host computer 52 selects a position detecting system 51, for example, which is closest to the transmitter 2 or whose radio wave strength is strong. The position detecting system 51 selected by the host computer 52 is used to determine the position of the transmitter 2.

Thus, the sixth embodiment may also obtain substantially similar effects to those of the first embodiment. In the sixth embodiment, the position detecting systems 51 are used on multiple pillars 101, and the control units 4 of the position detecting systems 51 are connected to the host computer 52. Therefore, even when a move of the transmitter 2 causes the positional relationship between each position detecting system 51 and the transmitter 2 to be changed, the host computer 52 may select an optimal position detecting system 51. Thus, accuracy in detection of the position of the transmitter 2 may be improved.

In the first embodiment, the control unit 4 is attached to the pillar 101. Alternatively, for example, the control unit 4 may be positioned near the pillar 101, and may be attached to a ceiling, a floor, or a wall. This configuration may be applied also to the second to sixth embodiments.

In the first embodiment, the multiple receivers 3A to 3D are attached to the pillar 101 serving as a pillar-shaped member. The present disclosure is not limited to this. For example, the receivers may be attached to a pillar-shaped member, which extends in the vertical direction from a floor, such as a locker. This configuration may be applied also to the second to sixth embodiments.

In the first embodiment, the case of the pillar 101 having a rectangular cross section is described as an example. The cross section may be triangular, polygonal, such as pentagonal and so on, circular, or elliptical. This configuration may be applied also to the second to sixth embodiments.

The embodiments described above are exemplary. Needless to say, partial replacement or combination of configurations described in difference embodiments may be made.

1, 11, 21, 31, 41, 51 position detecting system
2 transmitter
3A to 3D, 12A to 12D, 22A to 22D, 32A to 32D, 42A to 42C receiver
4, 13, 23, 33, 43 control unit
52 host computer
101, 201 pillar (pillar-shaped member)
102A to 102D, 202A, 202B corner portion
103A to 103D, 203A to 203C planar portion

What is claimed is:

1. A position detecting system comprising:
three receivers each configured to independently receive a radio wave transmitted from a transmitter; and
a controller that is connected to the receivers by wires and that is configured to determine a position of the transmitter based on the radio wave transmitted from the transmitter and received by receivers,
wherein the three receivers are attached circumferentially at different positions around a vertically extending pillar-shaped member such that each receiver is configured to receive the transmitted radio wave within an angular range extending away from the receiver on the pillar-shaped member,
wherein controller is configured to determine the position of the transmitter differently based on whether the transmitter is in a first area or a second area of a plurality of second areas,
wherein the first area is an area in which the angular range of each of the three receivers overlaps, and
wherein each of the plurality of the second areas is an area in which the angular range of only two of the three receivers overlap.

2. The position detecting system according to claim 1,
wherein the controller is configured to determine the position of the transmitter in the first area based on a difference in time of arrival of the transmitted radio wave at each of the three receivers, and
wherein the controller is configured to determine the position of the transmitter in the plurality of second areas based on:
the difference in time of arrival of the radio wave at the only two receivers; and
an angle of arrival of the radio wave, or an estimated distance based on a strength or arrival time of the radio wave.

3. The position detecting system according to claim 1,
wherein the pillar-shaped member has a polygonal cross section, and
wherein one of the receivers is attached to a corner portion of the pillar-shaped member.

4. The position detecting system according to claim 1, wherein two of the receivers are attached to the pillar-shaped member at a common circumferential position, but at different vertical positions.

5. The position detecting system according to claim 4, wherein the controller is further configured to determine the position of the transmitter differently for each of the two receivers.

6. The position detecting system according to claim 1, further comprising a fourth receiver positioned on the pillar-shaped member such that the transmitted radio wave is received within an angular range extending away from the fourth receiver on the pillar-shaped member only when the transmitter is in the plurality of second areas.

7. The position detecting system according to claim 6, wherein the fourth receiver is positioned on a planar portion of the pillar-shaped member.

8. A system comprising:
a plurality of the position detecting systems of claim 1, each associated with a different vertically extending pillar-shaped member; and
a host computer,
wherein the host computer is configured to receive the determined positions of the transmitter from each of the plurality of position detecting systems and to determine an optimal one of the determined positions.

9. The system according to claim 8, wherein the host computer is configured to determine the optimal one of the determined positions as the positioned determined by the position detecting system that is closest to the transmitter.

* * * * *